(12) United States Patent
Yang et al.

(10) Patent No.: US 12,487,470 B2
(45) Date of Patent: Dec. 2, 2025

(54) SYSTEM AND METHOD FOR GENERATING A TWO-DIMENSIONAL OPTICAL OR LASER BEAM OR LINE

(71) Applicant: Fuzhou Photop Optics Co., Ltd., Fuzhou (CN)

(72) Inventors: Yanfeng Yang, Cupertino, CA (US); Guanglong Yu, Fuzhou (CN); Junjie Yao, Fuzhou (CN); Xu Jia, Fuzhou (CN); Junmei Li, Fuzhou (CN)

(73) Assignee: Fuzhou Photop Optics Co., Ltd., Fujian Province (CN)

( * ) Notice: Subject to any disclaimer, the term of this patent is extended or adjusted under 35 U.S.C. 154(b) by 333 days.

(21) Appl. No.: 18/214,294

(22) Filed: Jun. 26, 2023

(65) Prior Publication Data

US 2024/0427164 A1 Dec. 26, 2024

(51) Int. Cl.
*G02B 27/09* (2006.01)
*G02B 27/42* (2006.01)

(52) U.S. Cl.
CPC ..... *G02B 27/4233* (2013.01); *G02B 27/0927* (2013.01); *G02B 27/0944* (2013.01); *G02B 27/0955* (2013.01); *G02B 27/42* (2013.01)

(58) Field of Classification Search
CPC ............ G02B 27/0927; G02B 27/0944; G02B 27/0955; G02B 27/42; G02B 27/4233
See application file for complete search history.

(56) References Cited

U.S. PATENT DOCUMENTS 11,561,409 B2 * 1/2023 Popovich ............... G02B 6/005

* cited by examiner

*Primary Examiner* — Ryan S Dunning
(74) *Attorney, Agent, or Firm* — The Webb Law Firm

(57) ABSTRACT

A system and method for generating a two-dimensional optical or laser beam, line, or pattern includes a diffractive optical element (DOE) for changing or modifying an intensity distribution of an input optical or laser beam passing through the DOE. A focal lens receives the changed or modified optical or laser beam exiting the DOE and focuses the changed or modified optical or laser beam. A bifocal relay optics receives the focused optical or laser beam exiting the focal lens and magnifies, changes or adjusts at least one length or dimension or a shape of the focused optical or laser beam. Finally, an imaging optics receives, converges and outputs the magnified, changed or adjusted focused optical or laser beam exiting the bifocal relay optics as an output optical or laser beam.

22 Claims, 4 Drawing Sheets

SYSTEM AND METHOD FOR GENERATING A TWO-DIMENSIONAL OPTICAL OR LASER BEAM OR LINE

BACKGROUND

1. Field

The present disclosure describes a system and method for creating an adjustable laser line or pattern, wherein one or more of a length or dimension or a shape of the laser line or pattern may be changed or adjusted.

2. Description of Related Art

There are many applications requiring an adjustable laser line with Gaussian or uniform intensity profile distributions for illumination or imaging systems. Usually, there is a requirement of length-to-width ratio or different requirements on the length of the laser beam along a long axis of the laser beam and the width along a short axis of the laser beam. To achieve this requirement, it is necessary for an optical system to include a laser line generator and relay optics to provide the required size, distribution and other performances on the illumination or imaging plane.

Heretofore, a cylindrical lens was used to focus (or converge) or diverse (or diverge) a Gaussian laser beam in one direction while keeping one or more other directions unchanged. This approach may provide a laser line with Gaussian profiles in two dimensions for a Gaussian input beam.

To achieve a uniform intensity distribution (flat top), the cylindrical lens redistributes the input Gaussian beam to a uniform intensity profile along one dimension. Due to the difficulty of a cylindrical lens's manufacturing process, it is challenging to precisely control the fan angle and the distribution of the output beam's profile.

Another challenge with using a cylindrical lens is the length-to-width ratio of the laser line. A high length-to-width ratio is difficult to realize using a cylindrical lens.

SUMMARY

Disclosed herein is an optical system and method for changing or adjusting an intensity distribution of an optical or laser beam that includes a diffractive optical element (DOE) which is operative or configured to create a laser line with desired uniform intensity profile in one dimension (e.g., a long axis) and Gaussian distribution in another dimension (e.g., a short axis) along with different requirements on the lengths of the laser line along the length L in the long axis and the width W in the short axis. To help satisfy these requirements, also disclosed herein is a relay optics which is operative or configured propagate the beam separately in the long and short axes and to adjust the focal lengths for the long and short axes to create combined separate magnifications in long and short axes.

Also disclosed herein is an optical system for changing or adjusting an intensity distribution of an optical or laser beam. The optical system comprises a diffractive optical element (DOE) operative or configured for changing or modifying an intensity distribution of an input optical or laser beam passing through and exiting the DOE. The changed or modified optical or laser beam exiting the DOE may be known in the art as a designed propagation laser beam. For consistency in this disclosure, the phrase "changed or modified optical or laser beam" will be used hereinafter. A focal lens is positioned to receive the changed or modified optical or laser beam exiting the DOE and is operative or configured for focusing the changed or modified optical or laser beam. A bifocal relay optics is positioned to receive the focused optical or laser beam exiting the focal lens and is operative or configured for positively or negatively magnifying, changing or adjusting at least one length or dimension or a shape of the focused optical or laser beam. Imaging optics are positioned to receive, converge and output the magnified, changed or adjusted focused optical or laser beam exiting the bifocal relay optics as an output optical or laser beam.

Also disclosed herein is a method of changing or adjusting an intensity distribution of an optical or laser beam comprising: a) via a first optical unit or element, expanding and collimating an input optical or laser beam; b) via a second optical unit or element, changing or modifying an intensity distribution of the expanded and collimated input optical or laser beam of step a; c) via a third optical unit or element, focusing the changed or modified intensity distribution optical or laser beam of step b; d) via a fourth optical unit or element, positively or negatively magnifying, changing or adjusting at least one length or dimension or a shape of the focused optical or laser beam of step c; and e) via a fifth optical unit or element, converging the magnified, changed or adjusted optical or laser beam of step d into an output optical or laser beam.

BRIEF DESCRIPTION OF THE DRAWING(S)

DESCRIPTION

Figure 1:
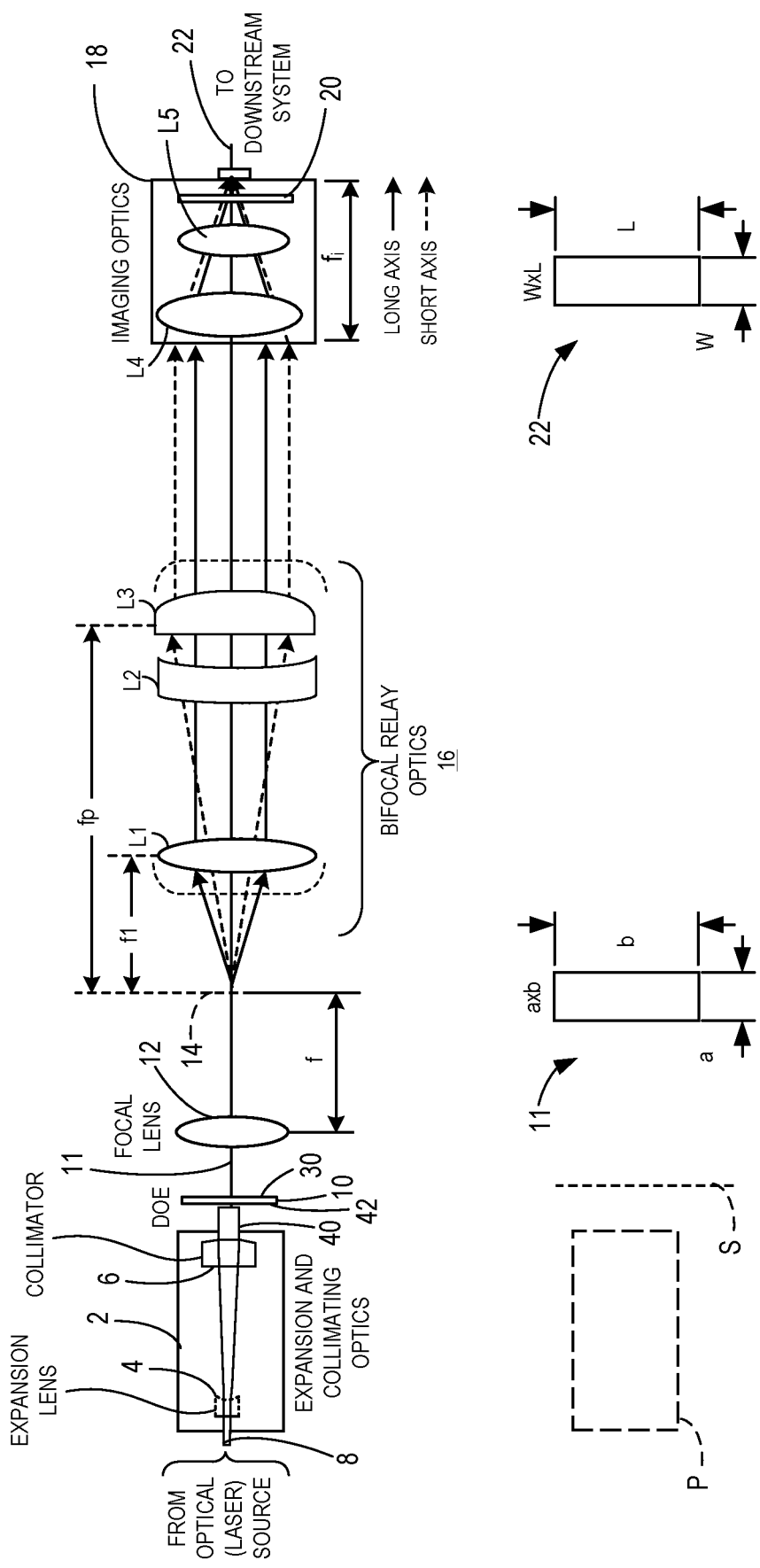
FIG. 1 is a schematic of an example optical system in accordance with the principles of the present disclosure.

Various non-limiting examples will now be described with reference to the accompanying figures where like reference numbers correspond to like or functionally equivalent elements.

For purposes of the description hereinafter, terms like "end," "upper," "lower." "right." "left." "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the disclosure. Hence, the specific examples or aspects disclosed herein are not to be construed as limiting.

Further, as used herein, all numbers expressing dimensions, physical characteristics, processing parameters, quantities of ingredients, reaction conditions, and the like, used in the specification and claims are to be understood as being modified in all instances by the term "approximately" or "about". Accordingly, unless indicated to the contrary, the numerical values set forth in the following specification and claims may vary depending upon the desired properties sought to be obtained by the present disclosure. At the very least, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one" or "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

With reference to FIG. 1, in some non-limiting embodiments or examples, an example optical system in accordance with the principles of the present disclosure may include, from left to right in FIG. 1, expansion and collimating optics 2 which may include an expansion lens 4 and a collimator 6 for expanding and collimating an input optical or laser beam 8 and outputting the same to a diffractive optical element (DOE) 10. The DOE 10, described greater detail hereinafter, may modulate the amplitude and/or phase of the optical or laser beam output by the expansion and collimating optics 2 and then output an amplitude and/or phase modulated optical or laser beam 1 (or target light pattern) 11 to a focal lens 12.

In an example, the focal lens 12 may focus the amplitude and/or phase modulated optical or laser beam 11 received from the DOE 10 to a focal plane 14 of the focal lens 12 positioned a distance f from the focal lens 12. In an example, the focal plane 14 may also be positioned a distance f1 from a first lens L1 of a bifocal relay optics 16 which may include second and third lenses L2 and L3. In this example, the focal plane of lens L1 may also be the focal plane 14.

In an example, lens L1 may be a spherical type lens and lenses L2 and L3 may be cylindrical type lenses. However, this is not to be construed in a limiting sense since it is envisioned that the bifocal relay optics 16 may include any number and/or types of lenses that facilitate the operation of the bifocal relay optics 16 in the manner described herein.

In an example, cylindrical lens L2 may include at least one convex surface configured to make the cylindrical lens L2 have a negative focal point. Cylindrical lens L3 may include at least one concave surface configured to make the cylindrical lens L3 have a positive focal point. An imaging optics 18, which has a focal length of fi, may be positioned to receive the optical or laser beam output by the bifocal relay optics 16.

In an example, the imaging optics 18 may be operative or configured to receive, converge and output the optical or laser beam exiting the bifocal relay optics 16 as an output optical or laser beam 22. In an example, the imaging optics 18 may include one or more lenses L4 and/or L5 and an, optional, filter or collimator 20 operative or configured for receiving, converging and outputting the optical or laser beam exiting the bifocal relay optics 16 to a downstream system as the output optical or laser beam 22. However, this is not to be construed in a limiting sense since it is envisioned that the imaging optics 18 may include any type or quantity of elements deemed suitable and/or desirable by one skilled in the art to accomplish the receiving, converging and outputting of the optical or laser beam exiting the bifocal relay optics 16 as the output optical or laser beam 22.

Figure 2:
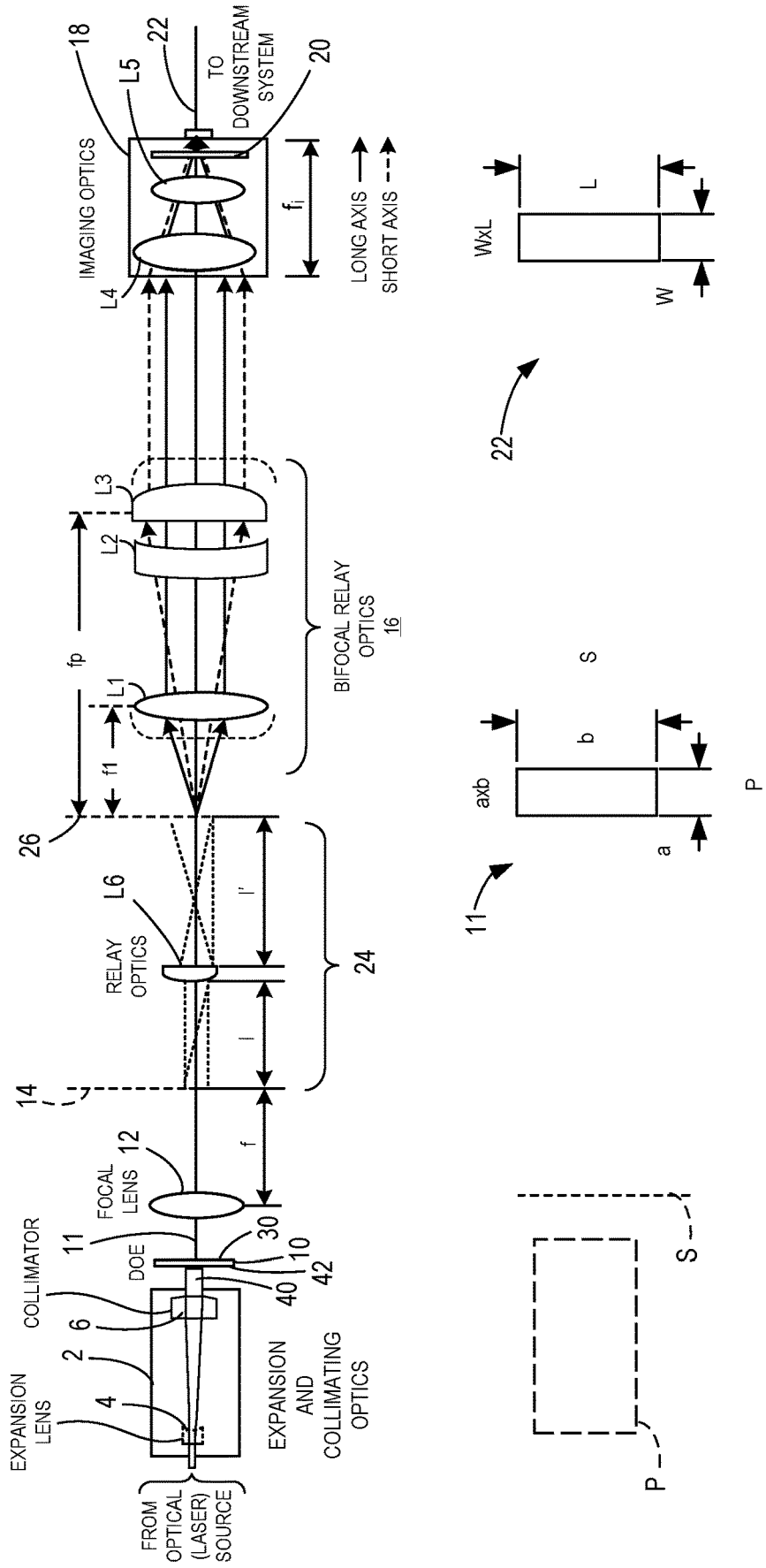
FIG. 2 is a schematic of another example optical system in accordance with the principles of the present disclosure.

Assuming solely for the purpose of discussion that an imaginary plane P (shown by the dashed line imaginary plane P) is parallel to the surface of FIG. 1 (and FIG. 2) and that an imaginary plane S (shown by a dashed line representing an edge of the imaginary plane S) is perpendicular to the surface of FIG. 1 (and FIG. 2). In the P plane, the combination of lenses L1, L2, and L3 comprising the bifocal relay optics 16 may, in an example, have a focal length of distance fp from the focal plane 14, while in the S plane lens L1 may, in an example, be positioned distance f1 from the focal plane 14.

In accordance with the principles of the present disclosure, the lenses L1, L2, and L3 comprising the bifocal relay optics 16 may have a fixed focal length in the S plane. However, the lenses L1, L2, and L3 comprising the bifocal relay optics 16 may have changeable or variable focal lengths in the P plane upon adjusting a position of lens L2 (left or right) relative to stationary lenses L1 and L3 of the bifocal relay optics 16.

In an example, if the focal length of the imaging optics 18 is fi, the magnifications of the combination of the bifocal relay optics 16 and the imaging optics 18 in the P and S planes may be defined as Mp and Ms, respectively, by the following equations:

$$Mp = -\frac{fi}{fp}$$

and $$Ms = -\frac{fi}{f1}.$$

In an example, and as shown in FIG. 1, the amplitude and/or phase modulated optical or laser beam 11 exiting the DOE 10 may have a short axis a (shown by dashed line arrows) parallel to the P plane and may have a long axis b (shown by solid line arrows) parallel to the S plane at a focal plane of the focal lens 12. As the amplitude and/or phase modulated optical or laser beam 11 exiting the DOE 10 passes, propagates or traverses through the bifocal relay optics 16, lenses L1-L3 may apply the different, positive or negative, magnifications Mp and Ms to each of the short axis a (shown by dashed line arrows) and the long axis b (shown by solid line arrows).

In an example, the imaging optics 18 may receive, converge and output the optical or laser beam exiting the bifocal relay optics 16 as the output optical or laser beam 22 having a width W and length L. In an example, the imaging optics 18 may receive, converge and output the optical or laser beam exiting the bifocal relay optics 16 without magnifying the short axis a and/or the long axis b or further adjusting the ratio of a/b as said optical or laser beam passes, propagates or traverses through the imaging optics 18, whereupon the width W and length L of the output optical or laser beam 22 are related to the dimensions of short axis a and the long axis b of the optical or laser beam exiting the bifocal relay optics 16 and entering the imaging optics 18.

In an example, some applications may require adjustment of the magnification of the amplitude and/or phase modulated optical or laser beam 11 output by the DOE 10 only in the P plane, i.e., only along the short axis a, such as via the optical system shown in FIG. 1. However, this is not to be construed in a limiting sense since it is envisioned that there may also be applications that may require magnification(s) of the amplitude and/or phase modulated optical or laser beam 11 output by the DOE 10 only in the S plane, i.e., along the long axis b, or in both the P and S planes, i.e., along the short axis a and the long axis b and, hence, the ratio of a/b. However, a desired ratio of a/b at an imaging plane of the imaging optics 18 may be challenging to achieve with the example optical system shown in FIG. 1 due to limitations in the manufacturing of the lenses L1-L3 of the bifocal relay optics 16. So, in an example, a relay optics 24 (described next) may be need.

With reference to FIG. 2, an example optical system in accordance with the principles of the present disclosure that overcomes this limitation may be similar to the optical system shown in FIG. 1 with the addition of a relay optics 24 disposed or positioned in a path of the optical or laser beam 11 output by the DOE 10 between the focal lens 12 and the bifocal relay optics 16.

In an example, the relay optics 24 may comprise a single lens L6 that may be a single spherical lens positioned between the focal lens 12 and the bifocal relay optics 16. However, this is not to be construed in a limiting sense since it is envisioned that the relay optics 24 may comprise any number of lenses that enable the relay optics 24 to perform optically in the manner described hereinafter. For the purpose of this description, it will be assumed that relay optics 24 comprises a single lens L6. However, this is not to be construed in a limiting sense.

In an example, the relay optics 24 may provide an adjustable magnification calculated by $$M1 = -\frac{l'}{l}$$

where l' is an adjustable distance between the surface of lens L6 that faces the bifocal relay optics 16 and a focusing plane 26, which, in this example, may be the object plane of lens L1, and where l is an adjustable distance between the surface of the lens L6 that faces the focal plane 14 of the focal lens 12.

In this example, the width a and the length b of the amplitude and/or phase modulated optical or laser beam 11 exiting the DOE 10 and passing through the focal lens 12 may be $$M1 \times a \text{ and } M1 \times b$$

where M1 is the magnification of the relay optics 24.

In this example, a and b are the width and the length of the amplitude and/or phase modulated optical or laser beam 11 in the short axis and the long axis, respectively. The magnification of the relay optics 24 is changeable by adjusting the distance l, while its conjugated distance l' will change according. In accordance with the principles of the present disclosure, the length L and width W of the optical or laser beam exiting the bifocal relay optics 16 on an image plane of the imaging optics 18 may be calculated as follows:

$$W = (M1 \times Ms)\, a = \left(\frac{l' fi}{l fp}\right) a,$$

$$L = (M1 \times Mp)\, b = \left(\frac{l' fi}{l f1}\right) b,$$

where the length-to-width ratio (L/W):

$$\frac{L}{W} = \left(\frac{fp}{f1}\right)\left(\frac{b}{a}\right).$$

where:
a and b are the respective width and length of the amplitude and/or phase modulated optical or laser beam 11 on the focal plane 14 of the DOE 11;
M1 is the magnification of the relay optics 24;
Mp and Ms are the magnifications of the bifocal relay optics in P plane and S plane, respectively; and
fi is the focal length of the imaging optics.

From the above equations, the length L and width W of the laser line output by the bifocal relay optics 16 on the image plane of the imaging optics 18 can be determined by the design parameters of the DOE 10, the relay optics 24 and the imaging optics 18 and are therefore adjustable to nominal design values. In this example, a length-to-width ratio (L/W) may be determined by the DOE 10 and bifocal relay optics 16 and therefore the ratio of L/W may be high because of the DOE properties.

Figure 3:
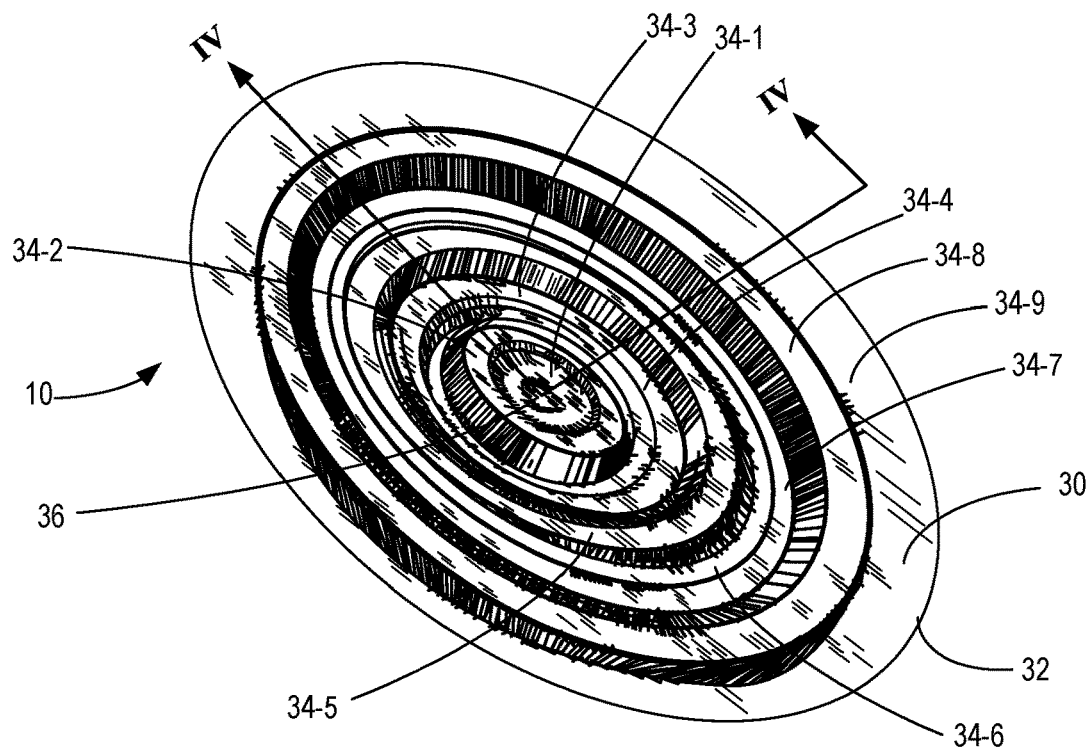
FIG. 3 is a schematic perspective view of a non-limiting embodiment or example diffractive optical element (DOE) in accordance with the principles of the present disclosure.
Figure 4:
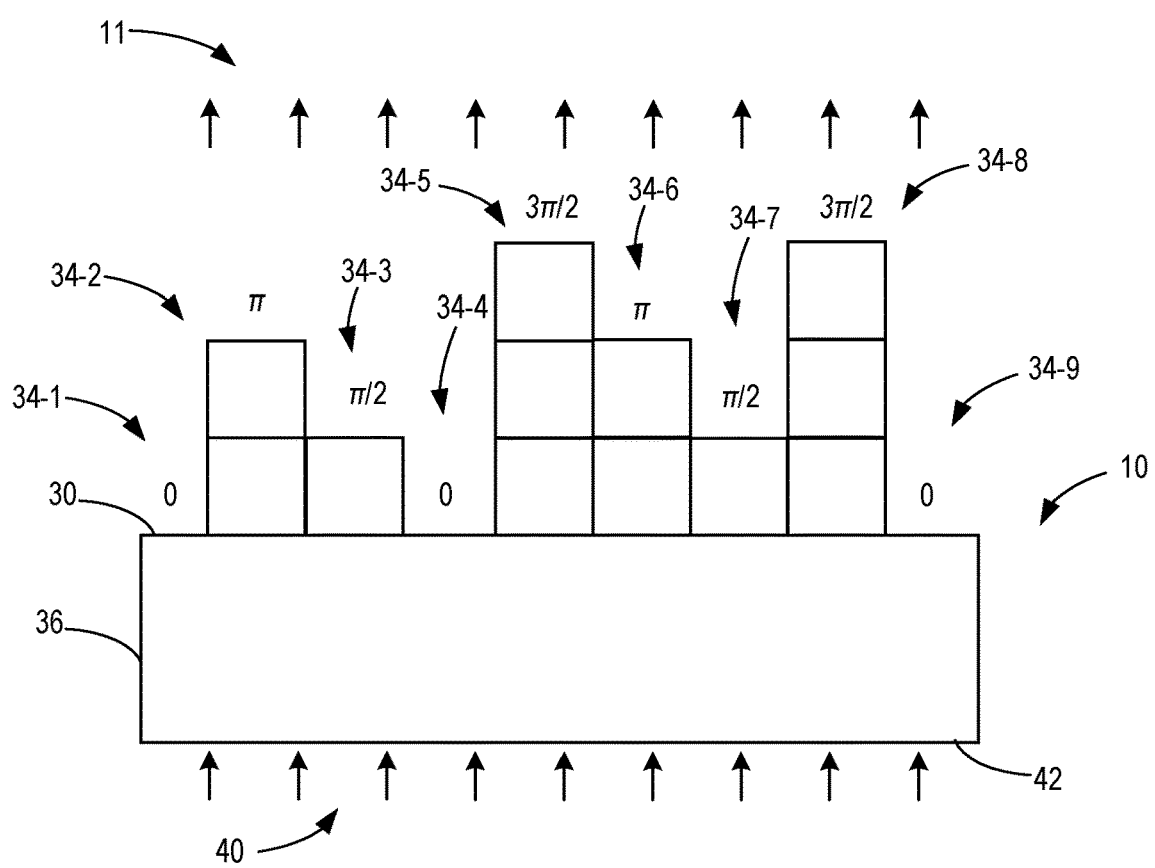
FIG. 4 is a section taken along lines IV-IV in FIG. 3.

With reference to FIGS. 3 and 4 and with continuing reference to FIGS. 1 and 2, in an example in accordance with the principles of the present disclosure, the DOE 10 may be a phase element that changes the intensity distribution of light passing through the DOE 10. The different intensities in the distribution of light passing through the DOE 10 is generated by different step depths (or heights) of relief structures formed or disposed on at least a first or top surface 30 of the DOE 10. The DOE 10 may use micro-optical technology to form specific relief structures with different depths (or heights), including a depth or height of zero (0), on at least the first surface 30 of an optical material substrate 32. These relief structures of different step depths (or heights) can be formed by optical glue or by an etching process on the optical material substrate 32.

In an example, the DOE 10 may include a number of relief structures 34 on the first surface 30 of the DOE 10. In an example, the relief structures 34 of the DOE 10 may be ring shaped and may be disposed coaxially about or around an axis or point 36 of the DOE 10. However, this is not to be construed in a limiting sense since is it envisioned that the relief structures 34 may have other shapes (other than ring shaped) and may be disposed on the surface 30 of the DOE 10 in other arrangements (other than coaxially about or around the axis or point 36). In an example, the DOE 10 may be circular (as shown, for example, in FIG. 3). However, this is not to be construed in a limiting sense since it is envisioned that the DOE 10 may have any suitable and/or desirable shape (other than circular).

In an example, the number of steps of the DOE 10 may be $N=2^m$, where m may be a whole number≥2. Taking m=2 as an example, there are four step depths representing the phases θ of 0, π/2, π, and 3π/2. The corresponding relationship between the phase θ of light exiting each relief structure 34 and the step depth (or height) h of each relief structure 34 is $0=2m\pi \times h/\lambda$; where m is the refractive index of the material forming the relief structure 34, h is the total depth (or height) of the relief structure 34 from the first surface 30 of optical material substrate 32, and λ represents the wavelength of the incident light 40.

In an example, the DOE 10 shown in FIGS. 3 and 4 includes ring shaped relief structures 34-1-34-9 on the first surface 30 of the DOE 10 and having depths (or heights) corresponding to wavelengths of incident light (from left-to-right in FIG. 4) 0, π, π/2, 0, 3π/2, π, π/2, 3π/2, and 0, respectively. In an example, the relief structures 34-1, 34-4 and 34-9 having a depth (or height) h=0 with respect to the top surface 30 of the DOE 10 may introduce no phase shift or no additional phase shift to those portions of the incident light 40 that enter a second surface 42 of the DOE 10, pass through the optical material substrate 32, and exit the DOE 10 via the relief structures 34-1, 34-4 and 34-9, having a depth (or height) of 0, on the first surface 30 of the DOE 10.

In an example, it is envisioned that the optical material substrate 32 may be formed a material that may or may not introduce a phase shift to the incident light 40 that passes through the optical material substrate 32. For example, where the optical material substrate 32 is formed of a material that introduces a phase shift, said phase shift may be introduced to all of the incident light 40 that passes through the optical material substrate 32 from the second surface 42 to the first surface 30. In another example, where the optical material substrate 32 is formed a material that does not introduce a phase shift, the incident light 40 may pass through the optical material substrate 32 from the second surface 42 to the first surface 30 without the introduction of any phase shift.

In another example, the relief structures 34-2 and 34-6 having a total depth (or height) h of π with respect to the top surface 30 of the DOE 10 will introduce a phase shift of π (or 180°) to those portions of the incident light 40 that enter the second surface 42 of the DOE 10, pass through the optical material substrate 32, and exit the DOE 10 via the tops of the relief structures 34-2 and 34-6. In other words, the total depth (or height) h of the relief structures 34-2 and 34-6 is selected to introduce a phase shift of π (or 180°) to those portions of the incident light 40 that exit the first surface 30 of the DOE 10 and pass through the relief structures 34-2 and 34-6.

In an example, the phase shifts and total depths (or heights) h associated with the relief structures 34 described herein are with respect to the wavelength λ of the incident light 40.

In another example, the relief structures 34-3 and 34-7 having a total depth (or height) h of π/2 with respect to the top surface 30 of the DOE 10 will introduce a phase shift of π/2 (or 90°) to those portions of the incident light 40 that enter the second surface 42 of the DOE 10, pass through the optical material substrate 32, and exit the DOE 10 via the tops of the relief structures 34-3 and 34-7. In other words, the total depth (or height) h of the relief structures 34-2 and 34-6 is selected to introduce a phase shift of π/2 (or 90°) to those portions of the incident light 40 that exit the first surface 30 of the DOE 10 and pass through the relief structures 34-3 and 34-7.

In another example, the relief structures 34-5 and 34-8 having a total depth (or height) h of 3π/2 with respect to the top surface 30 of the DOE 10 will introduce a phase shift of 3π/2 (or 270°) to those portions of the incident light 40 that enter the second surface 42 of the DOE 10, pass through the optical material substrate 32, and exit the DOE 10 via the tops of the relief structures 34-5 and 34-8. In other words, the total depth (or height) h of the relief structures 34-5 and 34-8 is selected to introduce a phase shift of 3π/2 (or 270°) to those portions of the incident light 40 that exit the first surface 30 of the DOE 10 and pass through the relief structures 34-3 and 34-7.

In an example, one, some, or all of the relief structures 34-2, 34-3, 34-5, 34-6, 34-7, and 34-8 may be configured to pass or substantially pass all of the portion of the incident light 40 that enters the relief structure 34 via first surface 30 of the optical material substrate 32 and exits the top surface of the relief structure 34. In another example, one, some, or all of these relief structures 34 may be configured, by selecting the degree of opacity or the degree of transparency of the relief structure 34, to attenuate, substantially attenuate, or block all of the portion of the incident light 40 that enters the relief structure 34 via first surface 30 optical material substrate 32 and exits the top surface of the relief structure 34. By selecting the degree of opacity or the degree of transparency of each relief structures 34, the amplitude of the light exiting the relief structures 34 may be controlled, along with the phases of the light described above, to achieve a desired lengths of the short axis a and the long axis b of the optical or laser beam at the imaging plane of the bifocal relay optics 16, and, hence, the ratio of a/b at the imaging plane of the imaging optics 18.

By way of the relief structures 34, the amplitude or phase of the incident light 40 may be modulated to achieve various optical functions, such as a beam shaping or a beam splitting. These relief structures 34, of different depths (or heights) h, may be formed by depositing an optical glue on the first surface 30 of the optical material substrate 32 or by etching the optical material substrate 32. According to a desired pattern of the amplitude and/or phase modulated optical or laser beam 11 output from the DOE 10 to the focal plane of the focal lens 12, the relief structures 34 may include $2^m$ steps to arrange the depth (or heights) h of each relief structure 34, where the depth (or heights) h of each relief structure 34 is a distance from the first surface 30 to the top of the relief structure 34.

By adjusting the amplitude and/or phases of $2^m$ portions of the incident light 40 via the relief structures 34, the incident light 40 may be shaped into the amplitude and/or phase modulated output optical or laser beam 22 having a desired intensity and phase distribution.

For example, to form the amplitude and/or phase modulated output optical or laser beam 22 with a one-dimensional (e.g., the short axis a) Gaussian profile distribution and a uniform (flat top) distribution along another dimension (e.g., the long axis b) on the focal plane of the focusing lens 12, the Full Width Half Maximum (FWHM) in short axis a and the length along the long axis b of the amplitude and/or phase modulated optical or laser beam 11 can be designed by selecting the input Gaussian beam aperture, focal length of the focal lens 12, and specific relief structures 34 of the DOE. By optimizing these parameters, the amplitude and/or phase modulated optical or laser beam 11 having desired lengths in both the short axis a and long axis b with satisfactory uniformity can be achieved on the focal plane of the focal lens 12.

FIGS. 1 and 2 illustrate the DOE 10 with the first surface 30, including the relief structures 34 (shown in FIGS. 3 and 4), facing the focal lens 12 and the second surface 42 facing the expansion and collimating optics 2. However, this is not to be construed in a limiting sense since it is envisioned that first surface 30, including the relief structures 34 (shown in FIGS. 3 and 4), can face the expansion and collimating optics 2 while the second surface 42 can face the focal lens 12.

Moreover, the DOE 10 including the relief structures 34 only on the first surface 30 is not to be construed in a limiting sense since it is envisioned, in an example that relief structures 34 may be provided on both the first surface 30 and the second surface 42. In this latter example, the total of the depth (or heights) h of optically aligned relief structures 34 on both surfaces may be selected to achieve a desired amplitude and/or phase of light exiting the optically aligned relief structures 34. To this end, the depth (or heights) h of the relief structures 34 on both surfaces can be selected to achieve a desired intensity distribution of the output optical or laser beam 22.

Figure 5:
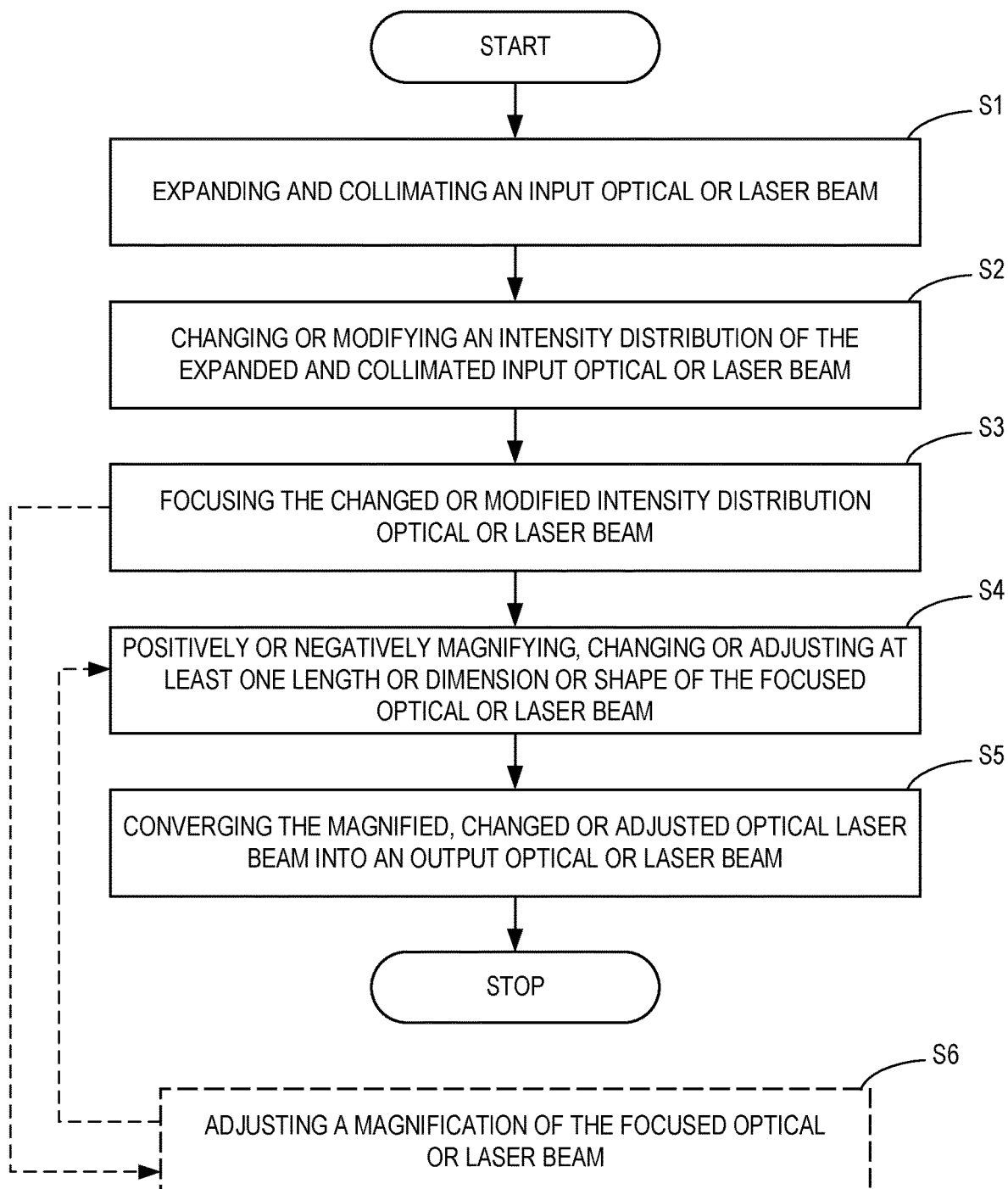
FIG. 5 is a flow diagram of a method in accordance with the principles of the present disclosure.

With reference to FIG. 5 and with continuing reference to all previous figures, a method in accordance with the principles of the present disclosure begins by advancing from a Start step to step S1 which includes expanding and collimating an input optical or laser beam. In an example, step S1 is accomplished or performed by a first optical unit or element, such as, for example, the expansion and collimating optics 2.

The method then advances to step S2 which includes changing or modifying an intensity distribution of the expanded and collimated input optical or laser beam of step S1. In an example step S2 is accomplished or performed by a second optical unit or element, such as, for example, the DOE 10.

The method then advances to step S3 which includes focusing the changed or modified intensity distribution optical or laser beam of step S2. In an example step S3 is accomplished or performed by a third optical unit or element, such as, for example, the focal lens 12.

The method then advances to step S4 which includes positively or negatively magnifying, changing or adjusting at least one length or dimension or a shape of the focused optical or laser beam of step S3. In an example step S4 is accomplished or performed by a fourth optical unit or element, such as, for example, the bifocal relay optics 16.

The method then advances to step S5 which includes converging the magnified, changed or adjusted optical or laser beam of step S4 into an output optical or laser beam. In an example step S5 is accomplished or performed by a fifth optical unit or element, such as, for example, the imaging optics 18.

The method may then advance to a Stop step.

The above method may optionally include a step S6 (shown in phantom) which includes adjusting a magnification of the focused optical or laser beam exiting the third optical unit or element in step S3 prior to entry into the fourth optical unit or element in step S4. In an example this optional step may accomplished or performed by a fifth optical unit or element, such as, for example, the relay optics 24.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. An optical system for changing or adjusting an intensity distribution of an optical or laser beam comprising:
   a diffractive optical element (DOE) operative or configured for changing or modifying an intensity distribution of an input optical or laser beam passing through the DOE;
   a focal lens positioned to receive the changed or modified optical or laser beam exiting the DOE and operative or configured for focusing the changed or modified optical or laser beam;
   bifocal relay optics positioned to receive the focused optical or laser beam exiting the focal lens and operative or configured for positively or negatively magnifying, changing or adjusting at least one length or dimension or a shape of the focused optical or laser beam; and
   imaging optics positioned to receive, converge and output the magnified, changed or adjusted focused optical or laser beam exiting the bifocal relay optics as an output optical or laser beam.

2. The optical system of claim 1, further including expansion and collimating optics for expanding and collimating the input optical or laser beam prior to entering the DOE.

3. The optical system of claim 1, wherein the input and the output optical or laser beams have different intensity distributions.

4. The optical system of claim 1, wherein the output optical or laser beam has an intensity distribution in the shape of an optical or laser line of length L and width W, wherein width W is less than length L.

5. The optical system of claim 1, further including relay optics positioned in a path of the focused optical or laser beam between the focal lens and the bifocal relay optics.

6. The optical system of claim 5, wherein the bifocal relay optics includes, in order of passage of the optical or laser beam through the bifocal relay optics, a spherical lens, a first cylindrical lens, and a second cylindrical lens.

7. The optical system of claim 6, wherein, at least one of the following:
   the first cylindrical lens includes at least one convex surface configured to have the first cylindrical lens have a negative focal point; and
   the second cylindrical lens includes at least one concave surface configured to have the second cylindrical lens have a positive focal point.

8. The optical system of claim 1, wherein the DOE includes a number of different height relief structures formed on a surface of a substrate.

9. The optical system of claim 8, wherein a height at least one of the different height relief structures is zero or the surface of the substrate.

10. The optical system of claim 8, wherein the number of different height relief structures include $N=2^m$ different heights, where m is a whole number $\geq 2$.

11. The optical system of claim 10, wherein the N number of different heights=$2^m$, where m is a whole number that is greater than 1.

12. The optical system of claim 11, wherein proximate or adjacent relief structures have different heights.

13. The optical system of claim 11, wherein, m=2, N=4 and the heights of the steps are 0, $\pi/2$, $\pi$, and $3\pi/2$, wherein the step height of 0 is the surface of substrate.

14. The optical system of claim 11, wherein a phase ($\theta$) of a portion of the optical or laser beam passing through a relief structure of the DOE=$(2n\pi)(h/\lambda)$, wherein:
n=a refractive index forming the relief structure,
h is the total height of the relief structure from the surface of a substrate, and
$\lambda$ is a wavelength of the portion of the optical or laser beam passing through the relief structure.

15. A method of changing or adjusting an intensity distribution of an optical or laser beam comprising:
a) via a first optical unit or element, expanding and collimating an input optical or laser beam;
b) via a second optical unit or element, changing or modifying an intensity distribution of the expanded and collimated input optical or laser beam;
c) via a third optical unit or element, focusing the changed or modified intensity distribution optical or laser beam;
d) via a fourth optical unit or element, positively or negatively magnifying, changing or adjusting at least one length or dimension or a shape of the focused optical or laser beam; and
e) via a fifth optical unit or element, converging the magnified, changed or adjusted optical or laser beam of into an output optical or laser beam.

16. The method of claim 15, wherein at least one of the following:
the first optical unit or element comprises expansion and collimating optics;
the second optical unit or element comprises diffractive optical element (DOE);
the third optical unit or element comprises a focal lens;
the fourth optical unit or element comprises bifocal relay optics; and
the fifth optical unit or element comprises imaging optics.

17. The method of claim 15, wherein the output optical or laser beam has the shape of a line of length L and width W, wherein width W is less than length L.

18. The method of claim 15, further including adjusting a distance between at least two lenses of the fourth optical unit or element, thereby changing an amount the focused optical or laser beam of step c is positively or negatively magnified, changed or adjusted.

19. The method of claim 15, wherein the second optical unit or element includes number of different height relief structures formed on a surface of a substrate.

20. The method of claim 19, wherein:
the number of different height relief structures includes N number of different heights; and
the N number of different heights=$2^m$, where m is a whole number that is greater than 1.

21. The method of claim 15, further including, via a sixth optical unit or element, adjusting a magnification of the focused optical or laser beam exiting the third optical unit or element prior to entry into the fourth optical unit or element.

22. The method of claim 21, wherein the sixth optical unit or element comprises relay optics.

* * * * *